Feb. 15, 1938.　　　　　　　J. F. JOY　　　　　　　2,108,536
TRACTOR TREAD MECHANISM
Original Filed July 1, 1935　　3 Sheets-Sheet 1
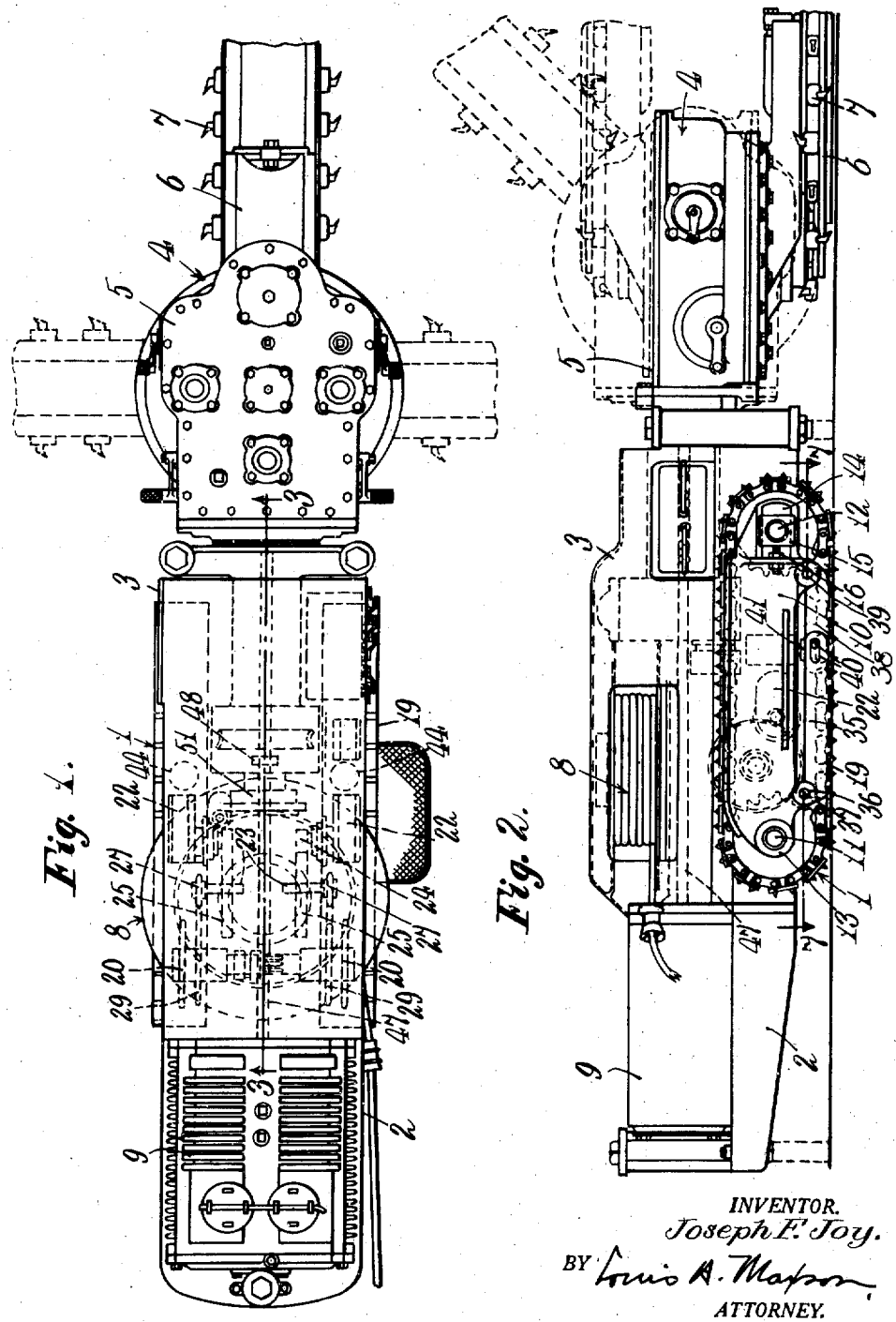
INVENTOR.
Joseph F. Joy.
BY Louis A. Matson
ATTORNEY.

Feb. 15, 1938.　　　　　J. F. JOY　　　　　2,108,536
TRACTOR TREAD MECHANISM
Original Filed July 1, 1935　　　3 Sheets-Sheet 2
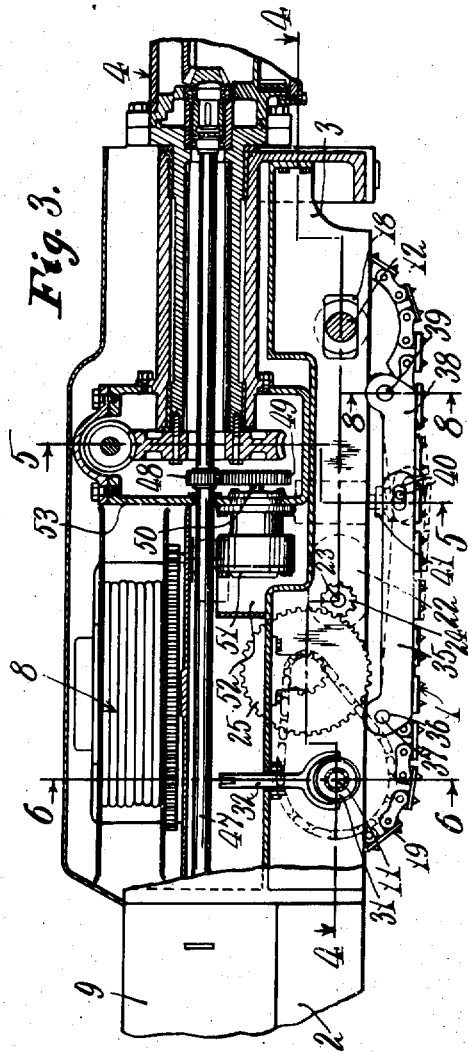
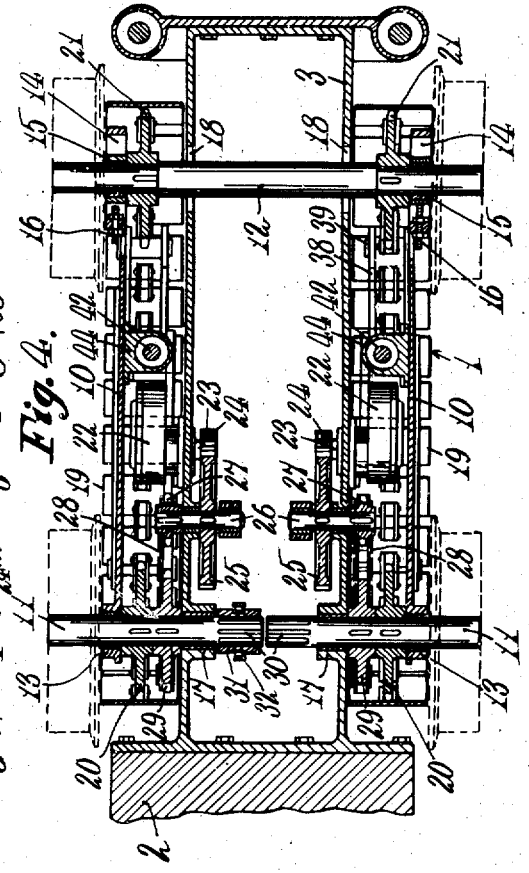
INVENTOR.
Joseph F. Joy.
BY
ATTORNEY.

Feb. 15, 1938.     J. F. JOY     2,108,536
TRACTOR TREAD MECHANISM
Original Filed July 1, 1935    3 Sheets-Sheet 3
Fig. 5.
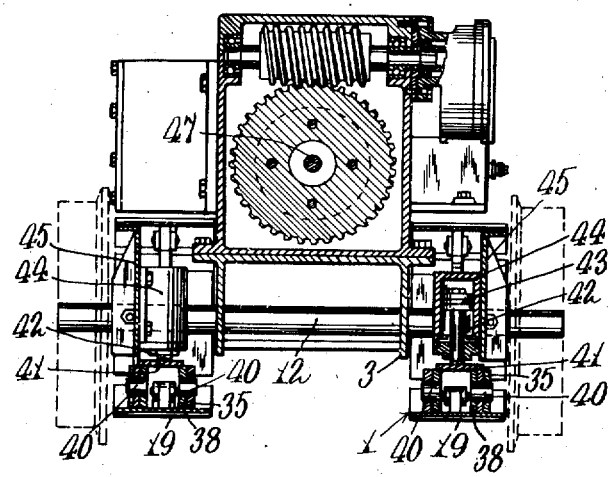
Fig. 6.
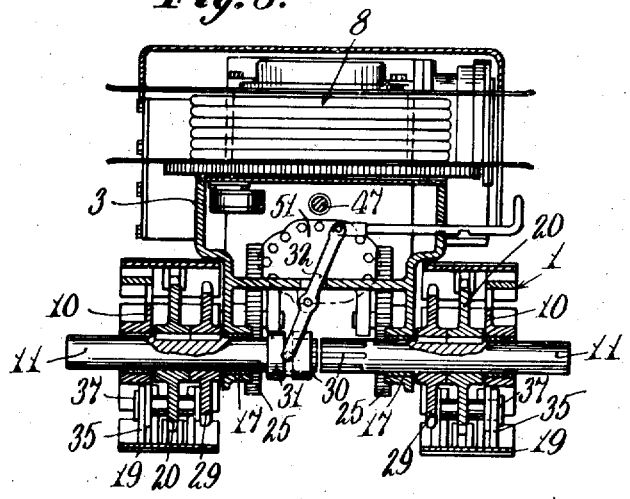
Fig. 8.
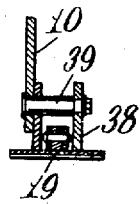
Fig. 7.
INVENTOR.
Joseph F. Joy
BY Louis A. Maxson
ATTORNEY.

Patented Feb. 15, 1938

2,108,536

UNITED STATES PATENT OFFICE 2,108,536

TRACTOR TREAD MECHANISM

Joseph F. Joy, Claremont, N. H., assignor to Sullivan Machinery Company, a corporation of Massachusetts Original application July 1, 1935, Serial No. 29,310. Divided and this application March 16, 1936, Serial No. 68,975

13 Claims. (Cl. 180—9.2)

This invention relates to tractor tread mechanism, and more particularly to improvements in tractor tread driving, supporting and guiding structure.

An object of this invention is to provide an improved tractor tread mechanism. Another object is to provide an improved guiding and controlling means for the tractor treads. A further object is to provide an improved tractor tread driving means. A still further object is to provide an improved means for varying the effective ground engaging surface of the tractor treads, whereby engagement of the treads with the ground surface may be varied to facilitate turning of the machine supported and propelled thereby. Still another object is to provide an improved means for increasing the effective area of the ground engaging surface of the tractor treads whereby during operation of the machine supported thereby, the treads may engage a relatively large area of the ground surface to stabilize the machine during its operation. These and other objects and advantages of the invention will, however, hereinafter more fully appear.

This application is a division of my copending application, Serial No. 29,310, filed July 1, 1935.

In the accompanying drawings, there is shown for purposes of illustration one form which the invention may assume in practice.

In these drawings,—

Fig. 1 is a plan view of a machine having embodied therein the illustrative form of the improved tractor tread mechanism.

Fig. 2 is a side elevational view of the machine shown in Fig. 1.

Fig. 3 is an enlarged view in longitudinal section taken substantially on line 3—3 of Fig. 1.

Fig. 4 is a horizontal sectional view taken substantially on line 4—4 of Fig. 3.

Fig. 5 is a cross sectional view taken substantially on line 5—5 of Fig. 3.

Fig. 6 is a cross sectional view taken substantially on line 6—6 of Fig. 3.

Fig. 7 is a horizontal sectional view taken substantially on line 7—7 of Fig. 2.

Fig. 8 is a detail sectional view taken on line 8—8 of Fig. 3.

In this illustrative embodiment of the invention, the improved tractor tread mechanism, generally designated 1, is embodied in a coal mining machine of the tractor tread supported and guided type, although it will be evident that the improved tractor tread mechanism may be associated with machines of various other types.

The mining machine disclosed herein generally comprises a base frame 2 supported by the tractor tread mechanism 1, and in turn supporting a frame 3 on the forward end of which is mounted a kerf cutting mechanism generally designated 4. The kerf cutting mechanism comprises a rotatable head 5 carrying a cutter bar 6 having mounted for circulation about its margin an endless cutter chain 7; the cutter head being rotatable relative to the frame of the machine to position the kerf cutter to cut plane kerfs in a mine wall in horizontal and vertical planes. Mounted on the frame 3 is a cable reel device, generally designated 8, for the power conductor cable, while supported on the rearward portion of the base frame is a motor 9 for driving through connections, clearly described in the above mentioned copending application, the kerf cutting mechanism 4. As the particular structure of the mining machine does not enter into this invention, further detailed description thereof is herein considered unnecessary.

The improved tractor tread mechanism 1 comprises tread frames 10 supporting alined rear axles 11, 11 and a front axle 12, the tread frames 10 having cylindrical bearing portions 13, supporting bearing sleeves in which the rear axles 11, 11 are journaled. Mounted in longitudinal guideways 14 formed in the forward portions of the tread frames 10 are adjustable bearing blocks 15 having adjusting screws 16 and supporting bearings, in which is journaled the front axle 12, in the manner clearly shown in Fig. 4. The base frame 2 of the mining machine is supported by the tractor treads, and has cylindrical bearing portions 17 supporting bearing sleeves alined with the alined bearing portions 13 of the tread side frames, and in which the alined rear axles 11, 11 are journaled; the forward portion of the base frame having longitudinal slot-like openings 18 in the side walls thereof, through which the front axle 12 extends, these openings permitting movement of the front axle with respect to the base frame. The tread frames 10 have upper guide members and relatively adjustable bottom guide members, to be later described, and guided on these frame members of the tread frames 10 are the top and bottom runs of endless track laying treads 19, 19, each in the form of an endless tread-plate-supporting block chain engaging drive sprockets 20, 20 respectively keyed to the alined rear axles 11, 11 and front guide sprockets 21 keyed to the front axle 12. The bearing blocks 15, guided on the tread frames, may be adjusted to move the front axle 12 in a longitudinal direction relative to the tread frames 10, 10 to take up undue slack in the endless tread chains 19, 19. The tractor tread chains are driven each by a hydraulic motor 22 of a conventional design, secured to the opposite sides of the base frame 2 of the machine, and projecting within the tractor treads between the top and bottom runs of the tread chains in the manner shown in Fig. 4. The power shaft 23 of each of these motors has keyed thereto a spur pinion 24 meshing with a spur gear 25 keyed to a horizontal, transversely extending shaft 26. The shafts 26 are arranged in axial alinement, as shown in Fig. 4, and are suitably journaled within the base frame 2 of the machine. These alined shafts 26 project outwardly through the sides of the base frame and have keyed thereto chain sprockets 27 engaging endless drive chains 28, in turn engaging chain sprockets 29 keyed to the alined rear axles 11, 11, respectively. The adjacent ends of the rear axles 11, 11 are splined at 30, and interlocked with the splineways of one axle is a sliding clutch element 31 operated by a pivoted clutch shipper member 32, and this clutch member is slidable axially from the position shown in Fig. 4 into interlocking engagement with the splineways on the end of the adjacent axle to connect the axles 11, 11 for rotation together. It will thus be seen that when the axles 11, 11 are connected together by the clutch 31, and the motors 22, 22 are operated, the tractor treads may be simultaneously driven through the gearings 24, 25, shafts 26, the chain and sprocket connections 27, 28, 29, and the drive sprockets 20 keyed to the rear axle. When the clutch 31 is shifted to the position shown in Fig. 4 to disconnect the axles, the tractor treads may be independently driven through the driving connections.

Means is provided for varying the effective area of the ground engaging surfaces of the track laying treads so that the tread area may be lessened when it is desired to turn sharply the machine by operating the track laying treads, and may be increased to provide a relatively wide ground engaging surface to stabilize the machine during the cutting operation. The means for varying the ground engaging area of the tractor laying treads comprises, for each tread, a bottom frame 35 pivotally connected at 36 to a horizontal pivot pin 37 supported by an upper guide frame 37ª. A cooperating frame 38 is likewise pivotally mounted on a horizontal pivot pin 39 supported by the adjacent upper guide frame, and the adjacent ends of these frames 35 and 38 are pivotally connected together by pin and slot connections 40. As illustrated, the pivoted bottom frames 35 and 38 engage the lower runs of the track laying treads and form the bottom supports for the tread frames and also cooperate to provide bottom guides for the endless traction treads. Engaging the top surface of each of the frames 38 is a plate 41 with which engages the lower end of a piston rod 42 of a piston 43 contained in a hydraulic jack cylinder 44 secured in a vertical position by a bracket 45 attached to the inner side of the adjacent tread frame 10. It will thus be seen that when hydraulic pressure is supplied to the upper ends of these jack cylinders, the latter are moved upwardly relative to the pistons contained therein to move the pivoted frames 35, 38 about their pivot pins from the full line position shown in Fig. 3 to the lower dotted line position shown in that figure, thereby varying the area of contact of the track laying treads with the ground surface. It will be evident that since the pivoted members 35 and 38 and plates 41 with which the piston rods 42 engage cannot move downwardly from the position shown in Fig. 2 due to the engagement of the treads with the ground surface and therefore the cylinders and upper guide frames must move upwardly to move the pivoted members from the position shown in Fig. 2 to the dotted line position shown in Fig. 3.

Now referring to the means for supplying hydraulic pressure to the tractor tread driving motors 22 and the jack cylinders 44, it will be noted that driven by the motor 9 is a transmission shaft 47 having keyed thereto, as shown in Fig. 3, a spur gear 48 meshing with a spur gear 49 secured to the drive shaft 50 of a pump 51. As illustrated, the pump 51 is arranged within a liquid containing reservoir 52 formed in the upper frame 3, the pump casing, in this instance, secured to the frame wall 53. The intake of the pump 51 communicates with the reservoir 52, and the discharge side of the pump is connected through suitable supply conduits under the control of a suitable valve mechanism to the tread driving motors 22 and the jack cylinders 44.

The mode of operation of the improved tractor tread mechanism will be clearly apparent from the description given. The mining machine is propelled about the mine from one working place to the other by the track laying treads 19 driven by the hydraulic motors 22, 22. When it is desired to effect propulsion of the machine in a straight path, the rear drive axles 11, 11 are connected together by the sliding clutch 31 so that the track laying treads are driven in unison. When it is desired to turn the machine in one direction or the other, the clutch 31 is moved into its released position to disconnect the rear axles 11, 11 thereby, enabling independent drive and control of the track laying treads by their individual driving motors 22, 22. To facilitate turning movement of the machine, hydraulic pressure may be supplied to the hydraulic jacks 44, 44 for the tractor treads so that the pivoted tread guide frames 35, 38 may be swung downwardly about their pivots with respect to the upper guide frames 37ª from the full line position shown in Fig. 3 to the dotted line position shown in that figure, thereby decreasing the contact area of the treads with the ground surface. When the mining machine is located in cutting position at the coal face, the hydraulic pressure is released from the tractor tread jacks 44 to move the pivoted guide frames into the position shown in Fig. 2, so that the relatively large surfaces of the tractor treads engage the mine floor to stabilize the machine during the cutting operation. When the mining machine is in cutting position at the coal face, the machine may be fed bodily toward and from the coal face by the tractor tread driving motors 22, these motors being reversible and operable to drive the tractor treads at a low cutting speed. Under certain conditions, the track laying tread driving motors may be independently operated to effect independent driving of the track laying treads simultaneously in opposite directions, thereby to swing the machine about a vertical axis to move the cutter bar about said axis in a horizontal plane across the coal face to effect a horizontal cut in the coal. Further uses and advantages of the improved tractor tread mechanism will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a machine of the class described, propelling means comprising endless traction treads and guiding means for said treads including upper and relatively movable lower guide frame parts providing upper and lower elongated guideways for the upper and lower runs of the treads and along which the treads are guided during their orbital movement, said bottom guide frame parts connected together and cooperating to provide said lower elongated guideways, means for individually or simultaneously driving said treads to propel and steer the machine, and means associated with each tread for moving the bottom guide frame parts with respect to the upper guide frame parts to change the shape of said bottom guideways thereby to vary the contact area of the ground engaging surfaces of said treads, said last mentioned means being operable to effect a decrease in the ground engaging surface area of the ground engaging portions of the treads to facilitate steering of the machine.

2. In a machine of the class described, propelling means comprising endless traction treads and guiding means for said treads including upper and relatively movable lower guide frame parts providing upper and lower elongated guideways for the upper and lower runs of the treads and along which the treads are guided during their orbital movement, said bottom guide frame parts connected together and cooperating to provide said lower elongated guideways, means for individually or simultaneously driving said treads to propel and steer the machine, and means associated with each tread for moving the bottom guide frame parts with respect to the upper guide frame parts to change the shape of said bottom guideways thereby to vary the contact area of the ground engaging surfaces of said treads including fluid operated jacks one individual to each tread, and means for controlling the supply of fluid pressure to said jacks, said frame-parts-moving means being operable to effect a decrease in the ground engaging surface area of the ground engaging portions of the treads to facilitate steering of the machine.

3. In a mining machine, a supporting frame, propelling and guiding means for said frame including endless traction treads, guiding means for said treads including upper and relatively movable lower guide frame parts providing elongated guideways for the upper and lower runs of the treads during orbital movement of the latter, said bottom guide frame parts connected together and cooperating to provide said lower elongated guideways, mechanism for independently or simultaneously driving said treads to propel and guide said supporting frame, and means associated with each tread for moving the bottom guide frame parts of the guiding means with respect to the upper guide frame parts to change the shape of the bottom guideways thereby to vary the effective contact area of the ground engaging surfaces of said traction treads.

4. In a mining machine, a supporting frame, propelling and guiding means for said frame including endless traction treads, mechanism for independently or simultaneously driving said treads to propel and guide said frame, and means associated with each tread for varying the effective contact area of the ground engaging surfaces of said traction treads including pivotally mounted, vertically swingable bottom tread guide frames providing elongated bottom guideways for the lower runs of the treads and means for swinging said pivoted frames about their pivots to change the shape of the bottom guideways.

5. In a machine of the character described, endless traction treads, tread guide frames for guiding said treads and including pivotally mounted, vertically swingable bottom tread guide frames cooperating to provide elongated bottom guideways for the lower runs of the treads, and means associated with each tread and acting upon said pivoted guide frames to effect swinging of the latter about their pivots to change the shape of the bottom guideways to vary the effective contact area of the treads with the ground surface.

6. In a machine of the character described, endless traction treads, tread guide frames for guiding said treads and including upper side frames and pivotally mounted, vertically swingable, bottom tread guide frames, the latter cooperating to provide elongated bottom guideways for the lower runs of the treads, and means associated with each tread and mounted on said side frames and acting upon said pivoted bottom guide frames to swing the latter about their pivots to change the shape of the bottom guideways to vary the effective contact area of the treads with the ground surface.

7. In a machine of the character described, endless traction treads, tread guide frames for guiding said treads and including upper side frames and pivotally mounted, vertically swingable, bottom tread guide frames, the latter cooperating to provide elongated bottom guideways for the lower runs of the treads, and means associated with each tread and mounted on said side frames and acting upon with pivoted bottom guide frames to swing the latter about their pivots to change the shape of the bottom guideways to vary the effective contact area of the treads with the ground surface, said bottom guide frame swinging means comprising a pair of hydraulic jacks respectively acting upon said pivoted bottom guide frames.

8. In combination, endless traction treads, tread guide frames including upper frame members for guiding the upper runs of said treads and bottom guide members for guiding the lower runs of the treads, the bottom guide members pivotally mounted on said upper guide frame members on horizontal axes at their remote ends and pivotally connected together on axes parallel with the guide member pivot axes, said pivoted guide members being swingable about their pivots in a vertical direction with respect to said upper frame members, and means associated with each tread and acting upon said pivoted guide members at points in adjacency to their axes of pivotal connection for swinging said bottom guide members about their pivots at their remote ends relative to said upper guide frame members to vary the effective contact area of the lower runs of the treads with the ground surface.

9. In combination, endless traction treads, tread guide frames including upper frame members for guiding the upper runs of said treads and bottom guide members for guiding the lower runs of the treads, said bottom guide members pivotally mounted on said upper guide frame members on horizontal axes at their remote ends and pivotally connected together on axes parallel with the guide member pivot axes, said pivoted guide members being swingable about their pivots in a vertical direction with respect to said upper frame members, and means associated with each tread and acting upon said pivoted guide members at points in adjacency to their axes of pivotal connection for swinging said bottom guide members about their pivots at their remote ends relative to said upper guide frame members to vary the effective contact area of the lower runs of the treads with the ground surface, said swinging means including power devices mounted on the upper guide frame members and acting upon said lower guide members.

10. In combination, endless traction treads, tread guide frames including upper frame members for guiding the upper runs of said treads and bottom guide members for guiding the lower runs of the treads, said bottom guide members pivotally mounted on said upper guide frame members on horizontal axes at their remote ends and pivotally connected together on axes parallel with the guide member pivot axes, said pivoted guide members being swingable about their pivots in a vertical direction with respect to said upper frame members, and means associated with each tread and acting upon said pivoted guide members at points in adjacency to their axes of pivotal connection for swinging said bottom guide members about their pivots at their remote ends relative to said upper guide frame members to vary the effective contact area of the lower runs of the treads with the ground surface, said swinging means including power devices mounted on the upper guide frame members and engaging said lower guide members, said power devices comprising hydraulic cylinders mounted on said upper guide frame members and pistons contained in said cylinders and operatively engaging said pivoted guide members.

11. In combination, endless traction treads, tread guide frames including upper frame members for guiding the upper runs of said treads and bottom guide members for guiding the lower runs of said treads, the bottom guide members pivotally mounted on said upper guide frame members on horizontal axes at their remote ends, said bottom guide members being swingable about their pivots in a vertical direction with respect to said upper frame members, and means acting upon said pivoted guide members at points in adjacency to their adjacent ends for swinging said guide members about their pivots at their remote ends relative to said upper guide frame members to vary the effective contact area of the lower runs of the treads with the ground surface.

12. In combination, endless traction treads, tread guide frames including upper frame members for guiding the upper runs of said treads and bottom guide members for guiding the lower runs of said treads, the bottom guide members pivotally mounted on said upper guide frame members on horizontal axes at their remote ends, said bottom guide members being swingable about their pivots in a vertical direction with respect to said upper frame members, and means acting upon said pivoted guide members at points in adjacency to their adjacent ends for swinging said guide members about their pivots at their remote ends relative to said upper guide frame members to vary the effective contact area of the lower runs of the treads with the ground surface, said swinging means including power devices mounted on the upper guide frame members and acting upon said lower guide members.

13. In combination, endless traction treads, tread guide frames including upper frame members for guiding the upper runs of said treads and bottom guide members for guiding the lower runs of said treads, the bottom guide members pivotally mounted on said upper guide frame members on horizontal axes at their remote ends, said bottom guide members being swingable about their pivots in a vertical direction with respect to said upper frame members, and means acting upon said pivoted guide members at points in adjacency to their adjacent ends for swinging said guide members about their pivots at their remote ends relative to said upper guide frame members to vary the effective contact area of the lower runs of the treads with the ground surface, said swinging means including power devices mounted on the upper guide frame members and engaging said lower guide members, said power devices comprising hydraulic cylinders mounted on said upper guide frame members and pistons contained in said cylinders and operatively engaging said pivoted guide members.

JOSEPH F. JOY.

---

CERTIFICATE OF CORRECTION.

Patent No. 2,108,536.            February 15, 1938.

JOSEPH F. JOY.

It is hereby certified that error appears in the printed specification of the above numbered patent requiring correction as follows: Page 3, second column, line 42, claim 7, strike out the word "with"; and that the said Letters Patent should be read with this correction therein that the same may conform to the record of the case in the Patent Office.

Signed and sealed this 5th day of April, A. D. 1938.

(Seal)                                                   Henry Van Arsdale,
                                                           Acting Commissioner of Patents.

and pivotally connected together on axes parallel with the guide member pivot axes, said pivoted guide members being swingable about their pivots in a vertical direction with respect to said upper frame members, and means associated with each tread and acting upon said pivoted guide members at points in adjacency to their axes of pivotal connection for swinging said bottom guide members about their pivots at their remote ends relative to said upper guide frame members to vary the effective contact area of the lower runs of the treads with the ground surface, said swinging means including power devices mounted on the upper guide frame members and acting upon said lower guide members.

10. In combination, endless traction treads, tread guide frames including upper frame members for guiding the upper runs of said treads and bottom guide members for guiding the lower runs of the treads, said bottom guide members pivotally mounted on said upper guide frame members on horizontal axes at their remote ends and pivotally connected together on axes parallel with the guide member pivot axes, said pivoted guide members being swingable about their pivots in a vertical direction with respect to said upper frame members, and means associated with each tread and acting upon said pivoted guide members at points in adjacency to their axes of pivotal connection for swinging said bottom guide members about their pivots at their remote ends relative to said upper guide frame members to vary the effective contact area of the lower runs of the treads with the ground surface, said swinging means including power devices mounted on the upper guide frame members and engaging said lower guide members, said power devices comprising hydraulic cylinders mounted on said upper guide frame members and pistons contained in said cylinders and operatively engaging said pivoted guide members.

11. In combination, endless traction treads, tread guide frames including upper frame members for guiding the upper runs of said treads and bottom guide members for guiding the lower runs of said treads, the bottom guide members pivotally mounted on said upper guide frame members on horizontal axes at their remote ends, said bottom guide members being swingable about their pivots in a vertical direction with respect to said upper frame members, and means acting upon said pivoted guide members at points in adjacency to their adjacent ends for swinging said guide members about their pivots at their remote ends relative to said upper guide frame members to vary the effective contact area of the lower runs of the treads with the ground surface.

12. In combination, endless traction treads, tread guide frames including upper frame members for guiding the upper runs of said treads and bottom guide members for guiding the lower runs of said treads, the bottom guide members pivotally mounted on said upper guide frame members on horizontal axes at their remote ends, said bottom guide members being swingable about their pivots in a vertical direction with respect to said upper frame members, and means acting upon said pivoted guide members at points in adjacency to their adjacent ends for swinging said guide members about their pivots at their remote ends relative to said upper guide frame members to vary the effective contact area of the lower runs of the treads with the ground surface, said swinging means including power devices mounted on the upper guide frame members and acting upon said lower guide members.

13. In combination, endless traction treads, tread guide frames including upper frame members for guiding the upper runs of said treads and bottom guide members for guiding the lower runs of said treads, the bottom guide members pivotally mounted on said upper guide frame members on horizontal axes at their remote ends, said bottom guide members being swingable about their pivots in a vertical direction with respect to said upper frame members, and means acting upon said pivoted guide members at points in adjacency to their adjacent ends for swinging said guide members about their pivots at their remote ends relative to said upper guide frame members to vary the effective contact area of the lower runs of the treads with the ground surface, said swinging means including power devices mounted on the upper guide frame members and engaging said lower guide members, said power devices comprising hydraulic cylinders mounted on said upper guide frame members and pistons contained in said cylinders and operatively engaging said pivoted guide members.

JOSEPH F. JOY.

---

CERTIFICATE OF CORRECTION.

Patent No. 2,108,536.                          February 15, 1938.

JOSEPH F. JOY.

It is hereby certified that error appears in the printed specification of the above numbered patent requiring correction as follows: Page 3, second column, line 42, claim 7, strike out the word "with"; and that the said Letters Patent should be read with this correction therein that the same may conform to the record of the case in the Patent Office.

Signed and sealed this 5th day of April, A. D. 1938.

(Seal)                                                             Henry Van Arsdale,
                                                                      Acting Commissioner of Patents.

CERTIFICATE OF CORRECTION.

Patent No. 2,108,536.                      February 15, 1938.

JOSEPH F. JOY.

It is hereby certified that error appears in the printed specification of the above numbered patent requiring correction as follows: Page 3, second column, line 42, claim 7, strike out the word "with"; and that the said Letters Patent should be read with this correction therein that the same may conform to the record of the case in the Patent Office.

Signed and sealed this 5th day of April, A. D. 1938.

Henry Van Arsdale,
Acting Commissioner of Patents.

(Seal)